United States Patent [19]

Barton et al.

[11] Patent Number: 4,879,597
[45] Date of Patent: Nov. 7, 1989

[54] PROCESSING OF VIDEO IMAGE SIGNALS

[75] Inventors: Nicholas Barton, Wokingham; Robert Billing, Crowthorne; Paul K. Burgess, Wokingham, all of Great Britain

[73] Assignee: Questech Limited, Wokingham, England

[21] Appl. No.: 148,610

[22] Filed: Jan. 26, 1988

[51] Int. Cl.[4] .................. H04N 5/262; H04N 13/00; H04N 13/02

[52] U.S. Cl. ................................. 358/88; 340/729; 358/160; 358/180; 358/183; 364/522

[58] Field of Search ................ 358/22, 88, 180, 183; 340/729; 364/522

[56] References Cited

U.S. PATENT DOCUMENTS 4,684,990 8/1987 Oxley .................................. 358/22

Primary Examiner—Howard W. Britton
Attorney, Agent, or Firm—Berman, Aisenberg & Platt

[57] ABSTRACT

In a method of processing a video signal to provide digital video effects, an image signal is provided with an accompanying reference signal or Z-axis signal representative of the instantaneous distance of the scanning point of the video raster from an imaginary plane to be depicted as containing said information, taken in a direction perpendicular to the image screen. This reference signal may then be utilized to produce a variety of effects. For example a circuit for superimposing sets of image information to give the impression of an overlap in three dimensional space may comprise an order sorting circuit (1) having inputs (2,3,4) for sets of signals comprising picture information (P) a key signal (K) and a Z-axis signal (Z). At outputs (5,6,7) of the circuit the sets of signals are sorted into order of priority dependent on the magnitude of the Z-axis signal (Z). The picture signals (P) are mixed by multipliers (25,26,27) and a summer (28) to provide a composite picture signal in which the mixing of the components is determined by the multiplication factors of the multipliers (25,26,27). These factors are derived from the key signals having corresponding orders of priority, the key signals of lower order of priority being correspondingly attenuated by cascaded attenuators (12,13,14) coupled between lower order outputs of the sorting circuit (1) and a weighting circuit (11) for controlling the multipliers (25,26,27).

9 Claims, 1 Drawing Sheet

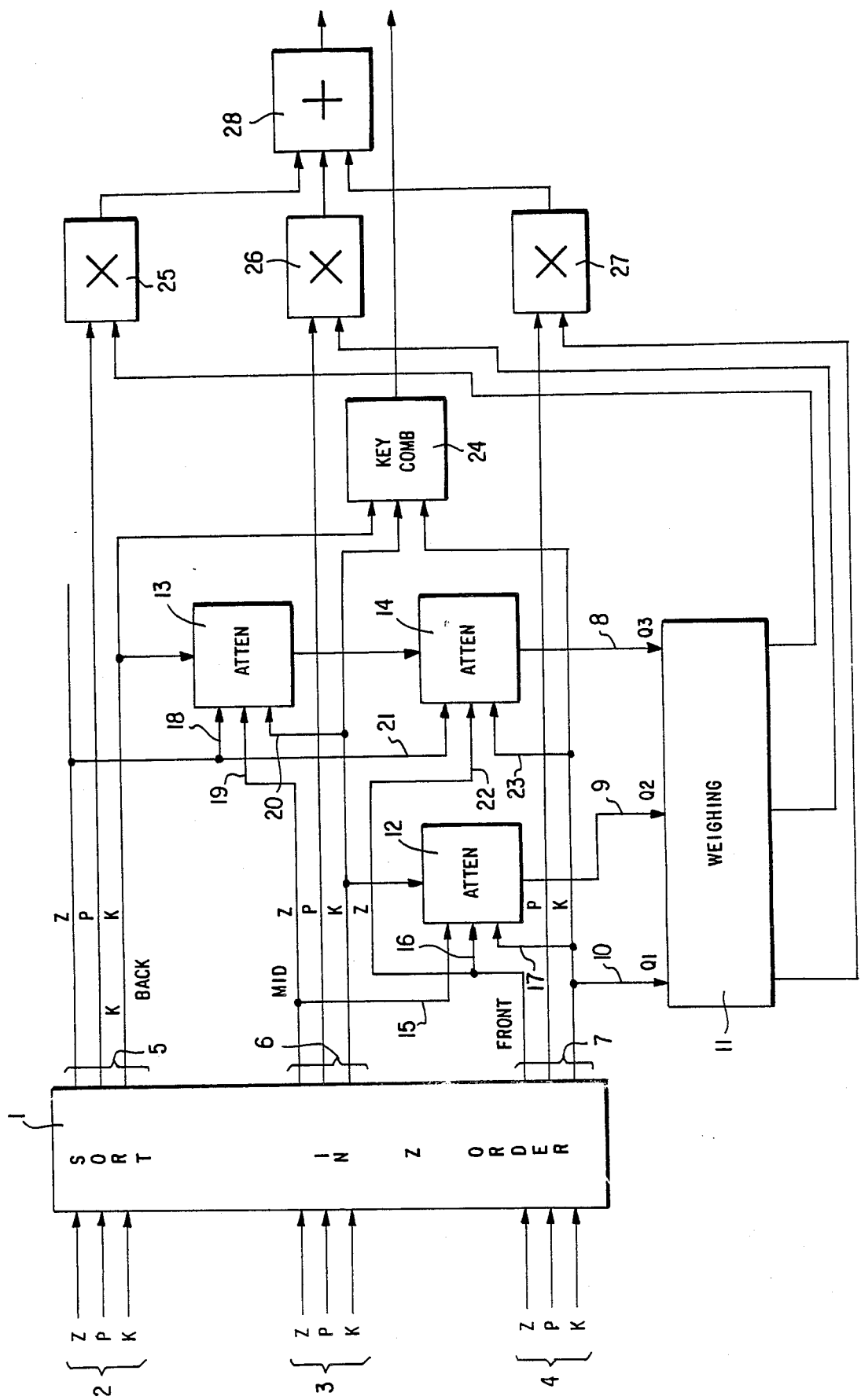

PROCESSING OF VIDEO IMAGE SIGNALS

This Application is related to co-pending applications 148,661, 148,609, and 148,612, the disclosure of which are incorporated herein by reference. Each application was filed on Jan. 26, 1988.

BACKGROUND OF THE INVENTION

This invention concerns improvements in the processing of video image signals to achieve so-called digital video effects.

In such processing, each field or frame of a television image is stored as a series of discrete digital values or pixels containing the luminance or chrominance information of the original signal and obtained by sampling the original signal at an appropriate pixel repetition rate. The original signal may be reproduced by scanning the store, or, by addressing the store in appropriately timed relation to synchronising signals defining the television raster, selected image information can be retrieved from the store and displayed on a television screen in any desired position or orientation. Such retrieved information may be combined with other image information to produce a pattern or collage of discrete images, and by moving the boundaries between respective patterns containing the separate picture information, various effects can be achieved.

One such effect is to give the illusion of several pictures moving in space, passing in front of and behind one another and/or intersecting. However, known devices for producing such effects suffer from unsatisfactory performance or one sort or another.

SUMMARY OF THE INVENTION

It is accordingly an object of the present invention to provide an improved system for producing effects of the kind referred to.

In order to define within the area of a video picture, a pattern having an outline within which image information is to be presented from a stored image field, it is necessary to accompany the image information retrieved from the store with a 'key' signal which may control cross-fading between separate sources of image information to be displayed. An appropriate means for producing such a key signal is described, for example, in our co-pending patent application Ser. No. 148,611 filed concurrently herewith.

It will be appreciated that in the production of an effect wherein the information from a stored image field is to be depicted as having a position in three-dimensional space with reference to other image information presented within the two-dimensional image frame, it is desirable to provide means by which the position of image information from a given source can be related to the three-dimensional space to be depicted in the composite image.

In accordance with the present invention, this object is attained by providing in association with a video signal from a given source a signal, hereinafter referred to as the Z-axis signal, the value of which represents the instantaneous distance of the scanning point of the video raster, in a direction perpendicular to the plane of the image screen, from a plane the position of which is computed in three dimensions with reference to the plane of the image screen and which is intended to be represented as containing the relevant image information from the corresponding source.

Such a Z-axis signal may be provided in terms of three signal values that are fixed for each field of the video raster and are provided by the means for computing the position of the relevant image plane in three-dimensional space, e.g. a microprocessor to the input of which corresponding control signals may be applied by manually operable means, in order to adjust the position of the relevant plane as it is desired to appear in the final picture. Thus, at the commencement of each image field, the microprocessor may provide a starting value representing the Z-axis coordinate of that pixel adjacent the origin of the scanning raster, and two associated incremental values, representing the rate of change of the relevant coordinate distance in the horizontal and vertical directions of the image screen. By incrementing the original signal in accordance with the movement of the scanning point of the raster, the required Z-axis signal is obtained.

Such a Z-axis signal may be used for a variety of purposes. For example images from different sources may be given the appearance of overlapping in three dimensional space by an arrangement which combines image information from a plurality of sources of stored image signals, and comprises means for providing in association with each image signal a key signal and a Z-axis signal, and means for mixing the corresponding image signals in a relationship determined by a comparison of the keying and Z-axis signals associated with the respective image signals. The Z-axis signal may be passed between units of the complete system by transforming it into a signal similar to a digital video signal and passing it through either serial or parallel data transmission hardware in the same way that a digital video signal is transmitted. A suitable transformation is to split a z-axis signal of, for example, fifteen bits into eight high-order and seven low-order bits and transform the high order signal so that 0 is transmitted as 1 and 255 as 254; and transform the low-order seven bits so that any one bit inverted is appended as the eighth bit. This gives a pair of eight-bit words which will never contain the bit patterns representing 0 or 255 and hence can be passed through digital video data transmission hardware.

In another arrangement, the Z-axis signal may be used to produce the effect of a picture vanishing into the distance or reflecting highlights by attenuating the key or mixing the video signal with a matte colour inproportion to a function derived by addressing a ROM with the Z-axis signal. Preferably, in order to reduce the visible stepping of the picture which this can produce, a signal representing a binary digit corresponding to half a unit of the key signal is generated. This signal is combined by a logical AND function with a signal produced by a logical exclusive OR function of the least significant horizontal address bit and the field square signal (true during one field and false during the other). The resulting signal is added to the key value, giving a square wave signal of amplitude equivalent to the least significant bit of the key and average value exactly half that.

In the aforementioned arrangement for combining images from different sources, the mixing of the image signals may be effected by combining the respective signals representing the luminance and chrominance information of the image in relative amplitudes determined by so-called Q values. Thus the arrangement may be such that the Q value of the source associated with a Z-axis signal the value of which indicates image information which is 'in front' of the other images is the key value of that source. The Q value of any subsequent source is the key signal of that source attenuated by a function of the key signal of any picture which overlays it. This function may also be dependent on the difference in Z co-ordinate between overlaying the overlaid picture. The Q value of the overlaid picture is then attenuated more as it passes further behind the overlaying picture and less as the key of the overlaying picture is reduced so that the overlaying picture may be caused to appear transparent to reveal the picture behind it by an amount varying with the distance between the planes of the pictures as represented in three dimensional space. Preferably the Q values are then scaled so that they add to unity and the scaled values are used as key signals to mix the video signals to produce a final video output. The original key signals are also combined to give a final output key signal.

BRIEF DESCRIPTION OF THE DRAWING

The single FIG. is a block circuit diagram of a circuit for mixing image information derived from separate video signal sources, in order to form a composite image signal.

DETAILED DESCRIPTION OF PREFERRED EMBODIMENT

Referring to the drawing, the reference numeral 1 indicates a circuit for sorting into a predetermined order a plurality of sets of signals applied .thereto. Thus, three sets of signals indicated generally at 2, 3 and 4 may be applied at corresponding inputs on the left hand side of the block 1 as shown in the drawing. Each set of signals includes picture image information indicated by the arrow designated P, a keying signal designated by the arrow K, and a Z-axis signal designated by the arrow Z. It will be appreciated that the picture information will in practice comprise separate digital values corresponding to pixels sampled to provide corresponding luminance and chrominance information, although only a single signal path is illustrated for simplicity. As mentioned above, the key signal can be derived from a pattern generating circuit as described in co-pending patent application identified by Ser. No. 148,611. Also the Z-axis signal is derived by processing three signal values provided from the output of the microprocessor. The means for deriving the Z-axis signal from such starting values may be substantially the same as the edge-signal generator circuit also described in co-pending application Ser. No. 148,611.

The circuit 1 is arranged to sort the sets of incoming signals 2, 3 and 4, in accordance with the instantaneous values of the Z-axis signals. Thus the circuit may be arranged to provide at outputs indicated by the reference numerals 5, 6 and 7, the image signals corresponding to three overlapping image planes which, at the corresponding point of the video screen, are to appear as the rearmost, the middle and the front images respectively.

The key signals from the respective outputs 5, 6 and 7 are applied to corresponding inputs 8, 9 and 10 of a weighting circuit 11 in the following manner. The signal from output 7 is applied directly to input 10, whereas the signal from output 6 is applied to input 9 via an attenuator circuit 12, and the signal from output 5 is applied to the input 8 via cascaded attenuator circuits 13 and 14. The attenuating factor of attenuator 12 is controlled by means of signals at inputs 15, 16 and 17, of which the input 15 is connected to the Z-axis signal bus of the output 6, the input 16 is connected to the Z-axis signal bus of the output 7, and the input 17 is connected to the key signal bus of output 7. Likewise the attenuator 13 has a signal input 18 connected to the Z-axis signal bus of output 5, a signal input 19 connected to the Z-axis signal bus of output 6 and a signal input 20 connected to the key signal bus of output 6. The attenuator 14 also has a signal input 21 connected to the Z-axis signal bus of output 5, a signal input 22 connected to the Z-axis signal bus of output Z and a signal input 23 connected to the key signal bus of output 7.

Each of the key signal buses from outputs 5, 6 and 7 is connected to a corresponding input of a key combining circuit 24, the output of which provides a resulting key signal for the composite video image.

The picture image buses from the respective outputs 5, 6 and 7 are connected to the inputs of corresponding multiplier circuits 25, 26 and 27, the other inputs of which are respectively connected to outputs from the weighting circuit 11. The outputs from the multiplier circuits 25, 26 and 27 are coupled to respective inputs of an adding circuit 28, the output of which provides the finally desired composite picture image signal.

The circuit described above has the effect of providing an output key signal that is a combination of the key signals from each of the sets of signals 2, 3 and 4, and a composite picture image signal which is obtained by mixing the picture image signals from each of the three sets of signals 2, 3 and 4, in proportions determined by the respective values of the key signals and Z-axis signals of the different sets. The mixing of the image signals is achieved in the following manner.

The key signal of that image to appear at the front of the composite picture is provided from output 7 directly to the input 10 of the weighting circuit 11, and this signal corresponds to the Q value referred to above. The key signal of that image to appear immediately behind the front image, i.e. the middle image, is provided from the output 6 to the input of attenuator 12 and thence to the input 9 of circuit 11. This key signal is therefore attenuated by a factor determined by the value of the key signal of the front image applied at input 17 of the attenuator 12 and the difference between the values of the Z-axis signals provided at inputs 15 and 16 from the outputs 6 and 7 respectively. A suitable means of determining the said factor is to use the expression $$(1-(K * (0.5+z)))$$

where K is the key value associated with the front image scaled to be in the range 0 to 1 and z is the distance between the front and back images scaled to rise from 0 to 0.5 over a suitable small distance and then be limited to 0.5 for any further increase in distance.

The key signal corresponding to the rearmost image and applied from output 5 is passed via the cascaded attenuators 13 and 14 to the input 8 of the weighting circuit 11, the attenuating factor of the attenuator 13 being varied in accordance with the relationships of the respective signals applied at inputs 18, 19 and 20 in precisely the same manner as the attenuator 12. In addition, a further attenuation is introduced by the attenuator 14 which also operates in a similar manner to the attenuator 12.

The respective Q values applied at inputs 8, 9 and 10 of the weighting circuit 11 are adjusted in such a manner that whilst the relationship between the signals remains the same, the sum of the signals has a value of unity. This is to ensure that when the three picture image signals applied to multipliers 25, 26 and 27 are multiplied by the corresponding Q values and then summed, the resulting composite picture signal has the same order of magnitude as each of the incoming signals to be mixed.

It will be appreciated that the arrangement of the invention as described will provide significant advantages over known circuits. In particular, the manner in which the Q values controlling the mixing of overlapping picture image information are varied in the regions of boundaries at which the Z-axis signals associated with respective signal sources tend to the same value, enables a smooth transition to be achieved between the respective picture images, which both enables the impression to be given of very clean edges at the boundaries of respective pictures, and also enables a controlled cross-fading to be achieved between the boundaries of such images when it is desired to give the impression of partial transparency of one or more edges in this region.

What is claimed is:

1. A method of processing a video image signal, wherein in order to enable image information from said signal to be modified in accordance with an apparent position of said information in three dimensional space with reference to a two dimensional image screen, there is provided in association with said image signal a Z-axis reference signal the value of which represents the instantaneous distance of the scanning point of the video raster of said screen, in a direction perpendicular to the plane of the image screen, from a plane the position of which is computed in three dimensions with reference to the plane of the image screen and which is intended to be represented as containing the relevant image information of the video signal, wherein the plane which is to be represented as containing said image information is a plane that is inclined with reference to said image screen and said Z-axis signal is derived for each field of the image signal from three computed, fixed values, namely a first value corresponding to the distance from the origin of the video raster to said inclined plane, in a direction perpendicular to the image screen, and second and third values corresponding to the rates of change of said distance in the horizontal and vertical directions of the image screen, by continuously incrementing said first value with said second and third values in synchronism with the movement of the scanning point of said video raster.

2. A method as claimed in claim 1, wherein image information from each of a plurality of sources is associated with a said Z-axis signal and with a key signal and that for the presentation of the information from the respective sources to give the appearance of overlapping in three dimensional space, the respective image signals are mixed in a relationship determined by the relationship between the corresponding Z-axis and key signals.

3. A method as claimed in claim 2, wherein the respective image signals are mixed in proportions determined by multiplying each signal with a corresponding weighting signal, the weighting signal corresponding to each image signal being proportional to its own key signal attenuated by a function determined by the key signal or signals of any or each other image signal of which the Z-axis signal has a higher order of priority.

4. A method as claimed in claim 3, wherein said attenuation function is further determined by the difference or differences between the magnitude of the Z-axis signal of the image signal concerned and the magnitudes of any or each other Z-axis signal of higher priority.

5. A method as claimed in claim 3 wherein said weighting signals are scaled in such a manner that they collectively add to unity.

6. A method for processing a video image signal, wherein in order to enable image information from said signal to be modified in accordance with an apparent position of said information in three dimensional space with reference to a two dimensional image screen, there is provided in association with said image signal a Z-axis reference signal the value of which represents the instantaneous distance of the scanning point of the video raster of said screen, in a direction perpendicular to the plane of the image screen, from a plane the position of which is computed in three dimensions with reference to the plane of the image screen and which is intended to be represented as containing the relevant image information of the video signal, wherein an image signal having an associated key signal and Z-axis signal is processed to produce the effect of a picture vanishing into the distance or reflecting highlights by attenuating the key signal, or mixing the video signal with a matte colour in proportion to a function derived by addressing a memory containing stored values of said function with the Z-axis signal.

7. A device for use in mixing a plurality of video picture image signals in order to give the impression of a plurality of images located in planes occupying different positions in three dimensional space with reference to a two dimensional video display screen, and overlapping in said three dimensional space, comprising a plurality of signal providing means for providing in association with each image signal to be mixed, a key signal and a Z-axis reference signal the value of which represents the instantaneous distance of the scanning point of the video raster of said display screen, in a direction perpendicular to the plane of said screen, from the location of the plane in which the corresponding image is to be represented, an order sorting circuit having a plurality of sets of inputs, each coupled to a corresponding signal providing means to receive respectively the picture signal and associated key and Z-axis signals, and a corresponding plurality of outputs for providing such picture, key and Z-axis signals, said outputs having an order of priority and the said circuit being arranged to direct sets of signals received at said inputs to the respective outputs in order of priority determined by the magnitudes of the respective incoming Z-axis signals; a plurality of multiplier circuits each coupled to receive picture signals from a corresponding output of said order sorting circuit; a summing circuit for summing signals provided at outputs of said multiplier circuits; and weighting means for controlling the multiplication factor of each of said multiplier circuits as a function of the order of priority of that key corresponding to the picture signals provided thereto, in order to control the proportions in which picture signals are mixed by said summing circuit.

8. A device according to claim 7, wherein the key signal output of that set of outputs of the order sorting circuit having the highest priority is connected directly to the said weighting means, and the remaining key signal outputs are connected to said weighting means by way of attenuators connected in cascade such that each key signal output of higher priority controls one or more attenuators forming a stage of attenuation of a key signal of lower priority.

9. A device according to claim 8, wherein each attenuator connected between a given key signal output and said weighting means is further arranged to be controlled by a factor determined by the difference between the magnitude of the Z-axis signal corresponding to the given key signal and the magnitude of the Z-axis signal corresponding to the key signal controlling that attenuator.

* * * * *